C. PIVA.
APPARATUS FOR HOLDING SILK AND SIMILAR MATERIAL.
APPLICATION FILED JULY 21, 1916.
1,230,511. Patented June 19, 1917.
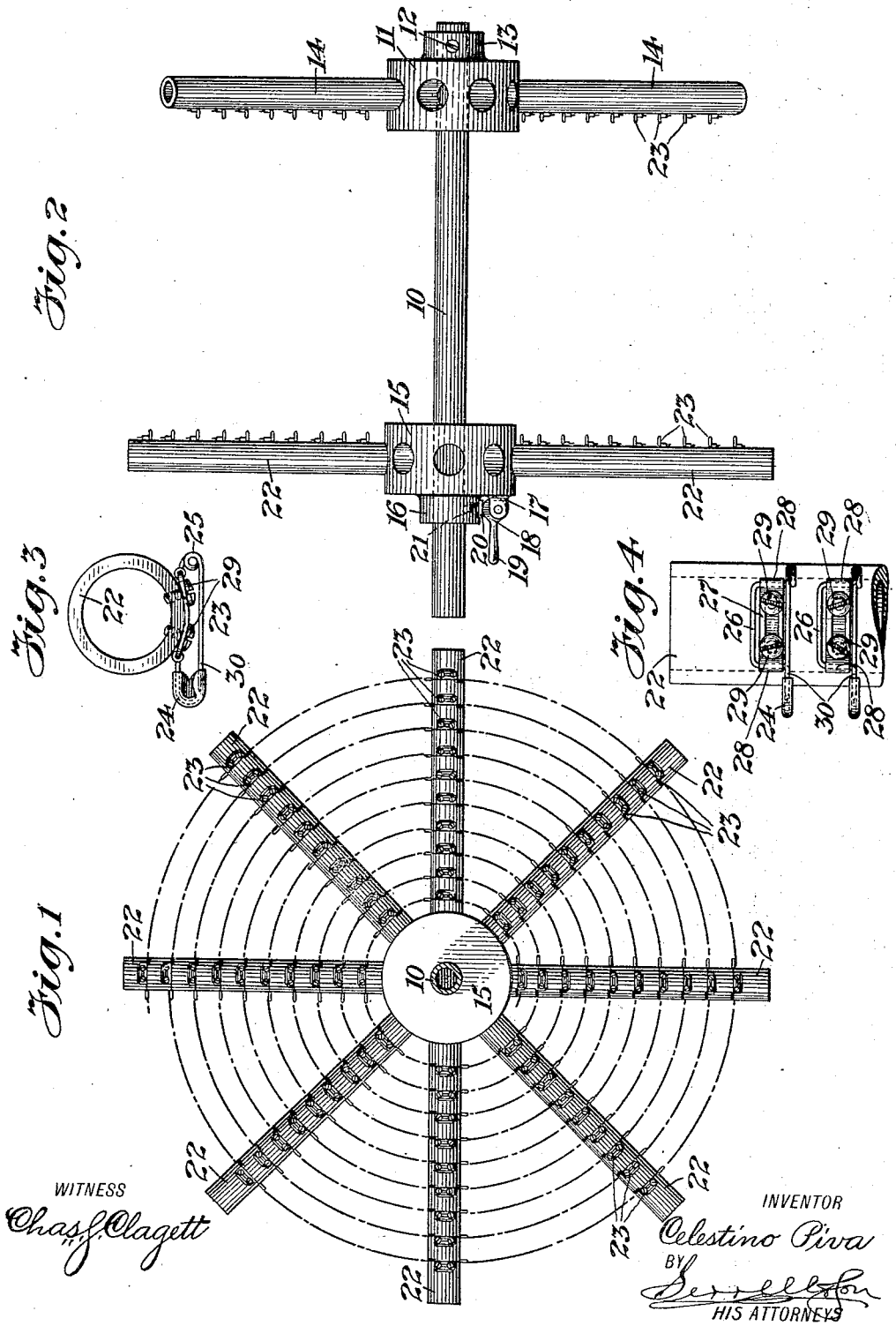

UNITED STATES PATENT OFFICE.

CELESTINO PIVA, OF NEW YORK, N. Y.

APPARATUS FOR HOLDING SILK AND SIMILAR MATERIAL.

1,230,511.          Specification of Letters Patent.      Patented June 19, 1917.

Application filed July 21, 1916. Serial No. 110,487.

*To all whom it may concern:*

Be it known that I, CELESTINO PIVA, a subject of the King of Italy, residing in the borough of Manhattan, city, county, and State of New York, have invented an Improvement in Apparatus for Holding Silks and Similar Material During the Dyeing or other Treatment Thereof, of which the following is a specification.

While my present invention relates primarily to an apparatus for holding silk while dyeing or otherwise treating the same, it will be understood that the apparatus is not limited to such use as it may be employed for similar purposes with material of any nature whatsoever. Silk as is commonly known is an animal product and like many other animal products in its natural state has certain animal characteristics among the more important of which is the tenacity with which the particles of the material adhere to one another. Also like many other animal substances when subjected to intense heat the tenacity of the particles of silk becomes impaired so that the same in bending or rubbing the woven material break away as it were and form tentacles or small figure-like members which extend outwardly and of course are a detriment to the finished product, so much so that in finishing the product these tentacle like portions of the silk have to be pressed back and secured into place.

Heretofore in dyeing and other treatment of woven silk the material has been wound upon reels in the form of a spiral by being passed over a series of suitably placed rods. In so doing the entire width of the silk contacts with each one of these rods and due to the fact that it is impossible to keep the material from shifting in the reel, the rubbing of the silk against these rods causes the disruption to a greater or less extent of the material as hereinbefore stated particularly after being subjected to the heat of the dyeing bath, as well as in various other treatments.

The object of my invention is a provision of an apparatus for overcoming this difficulty and one in which when the silk or other material is placed in the apparatus for being dyed or subjected to other treatment no portion of the silk comes into contact with any surface whatsoever, not even one portion of the material with another portion thereof, although as also known to those skilled in the art the contact of the silk with itself will not injure the texture of the same. In carrying out my invention therefore I preferably employ a rod or spindle upon which hubs are mounted, one or both of which may be adjustable and in both of which there are radially disposed arms or spokes. These are employed in alternating or staggered positions and on the inner surface of each of the same there are fixed devices for engaging the edge or selvage of the material which is placed in the apparatus in the form of a spiral so that no portion of the material contacts with itself or any foreign substance and hence its texture cannot be injured by any rubbing contact no matter to what treatment it may be subjected.

In the drawing, Figure 1 is an elevation and partial cross section of my improved apparatus.

Fig. 2 is a side elevation of the same.

Fig. 3 is a plan, on an enlarged scale, of one end of the arms or spokes showing an engaging attachment secured thereto, and Fig. 4 is a side elevation of the parts shown in Fig 3.

Referring particularly to the drawing the apparatus comprising my present invention includes a shaft or spindle 10 on which there is mounted a hub 11 which may be secured in place by a set screw 12 passing through the reduced end 13 of the hub, and the hub 11 is provided with radial arms or spokes 14. I also employ a hub 15 similar to the hub 11 with the exception that the hub 15 is adjustable to position longitudinally on the spindle 10 depending upon the width of the material to be placed in the apparatus. The hub 15 is also provided with a reduced end 16 and on the same side with a lug 17 in which latter there is pivotally mounted a cam latch 18 provided with a handle 19. In the reduced end 16 there is a set pin 20 normally maintained in position against the surface of the cam 18 by a spring 21. It will be evident that by moving the cam 18 by the handle 19 the pin 20 may be fixed against the spindle 10 to secure the hub 15 in any desired position thereon. The hub 15 is also provided with a plurality of radially placed spokes or arms 22 and of the same number as the spokes 14 in the hub 11 and when in position the corresponding spokes 14 and 22 are employed to support the material to be placed in the apparatus.

In order to prevent injury to the material as hereinbefore outlined, I provide each pair of spokes or arms 14 and 22 with suitable engaging devices for securing in position the opposite edges of the material to be placed in the apparatus. As illustrated in the drawing I have shown a series of safety pins for so engaging the edges of the material although as it will be understood any suitable engaging device may be employed. By reference to Figs. 3 and 4 each safety pin 23 includes a head 24 of the pin which as usual is at one end thereof and a loop 25 which is at the other end. Intermediate of the head 24 and loop 25 the body member of the pin is provided with a U-shaped bend 26. Together with the pin thus formed I employ a clamp 27 the opposite ends 28 of which are turned over to engage the parallel portions of the U-shaped bend in the pin. Each clamp member 27 is slotted so as to receive the screws 29 by which the same and the pin secured therein are fixed in position in the radial arm or spoke with which they are associated. As in the ordinary safety pin the pointed pin member 30 may be engaged or disengaged from the head of the pin in the usual manner.

In the use of the foregoing apparatus the hub 15 and its associated parts are adjusted to position on the spindle 10 depending on the width of the material and then the edges of the material are secured in place by passing corresponding pins through the same and turning the apparatus so that the edges of the material may be successively engaged by each successive pin clamp until the apparatus is filled with the material in the form of a spiral as indicated in Fig. 1, the dotted lines indicating the manner in which the material is wound and held in the apparatus. When so placed in the apparatus the material may be dyed or otherwise treated without injury to itself in any manner whatsoever.

In placing the apparatus in the vat or tank containing the dye stuff, it may assume a position in which the shaft or spindle 10 is horizontal as illustrated in the drawing, or one in which the shaft is placed in a vertical position.

From the foregoing description it will be apparent that the space between the hub 11 and its arms 14 and the hub 15 and its arms 22 will depend upon the width of the material to be placed in the apparatus in any given use thereof. It is furthermore to be understood that in adjusting the hub 15 and its arms 22 to position on the spindle 10, the arms 22 are so placed as to alternate with the arms 14 in the hub 11, that is to say, the arms or spokes 22 are so placed as to assume a staggered relationship with the arms 14. The object of this is to prevent the formation of pockets in the material when secured in the apparatus so that the material may be properly drained and will have no pockets to hold the dye stuff or other substance with which it is being treated. Still furthermore it will be understood that in some instances it may be possible to adjust the hub 15 to position so that the arms 22 therein will assume the same radial positions as the arms 14, although as hereinbefore stated the staggered position of the arms is found in practice to be the preferable one.

I claim as my invention:

1. An apparatus for holding silk and the like for dyeing or other operations comprising a spindle, a plurality of radially disposed arms suitably placed and connected to the said spindle, and means associated with the arms for engaging the edges of the material to secure the same in a supported position in the apparatus.

2. An apparatus for holding silk and the like for dyeing or other operations comprising a spindle, a plurality of radially disposed arms, means for connecting the same to the said spindle, and means associated with the said arms for engaging the edges of the material to be supported in the apparatus.

3. An apparatus for holding silk and the like for dyeing or other operations comprising a spindle, hub members thereon, a plurality of radially placed arms secured in each hub member, and means associated with the said arms for engaging the edges of the material to be supported in the apparatus.

4. An apparatus for holding silk and the like for dyeing or other operations comprising a spindle, a hub fixed thereon, a plurality of radially placed arms in the said hub, a hub adjustable to position on the said spindle, a corresponding number of radially disposed arms in said adjustable hub, and means associated with each of said arms for engaging the edges of the material to be supported in the apparatus.

5. An apparatus for holding silk and the like for dyeing or other operations comprising a spindle, a hub fixed thereon, a plurality of radially placed arms in the said hub, a hub adjustable to position on the said spindle, a corresponding number of radially disposed arms in said adjustable hub, and a plurality of hook pins attached to the inner side of each of the said radially disposed arms for engaging the edges of the material to secure the same to a supported position in the apparatus.

Signed by me this 10th day of July, 1916.

CELESTINO PIVA.

Copies of this patent may be obtained for five cents each, by addressing the "Commissioner of Patents, Washington, D. C."